Nov. 7, 1967  H. D. SMITH  3,351,749
FUNCTION GENERATOR USING LINEAR ELEMENTS
Filed Sept. 9, 1963
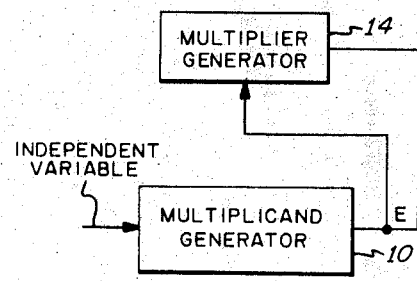
FIG. 1.
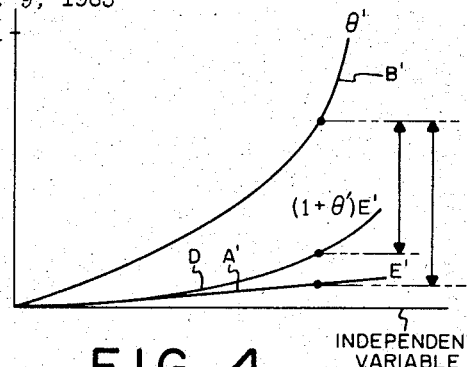
FIG. 4.
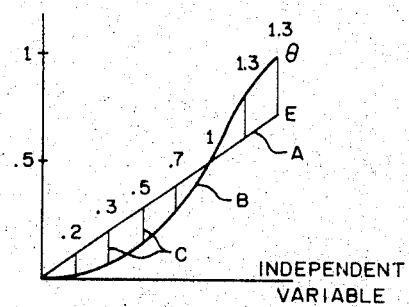
FIG. 2a.
FIG. 2b.
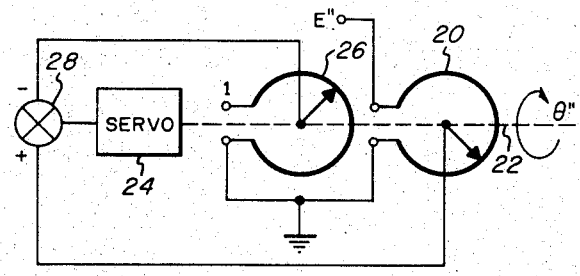
FIG. 5.
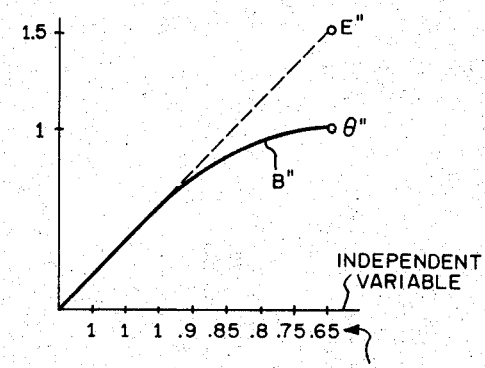
FIG. 6.
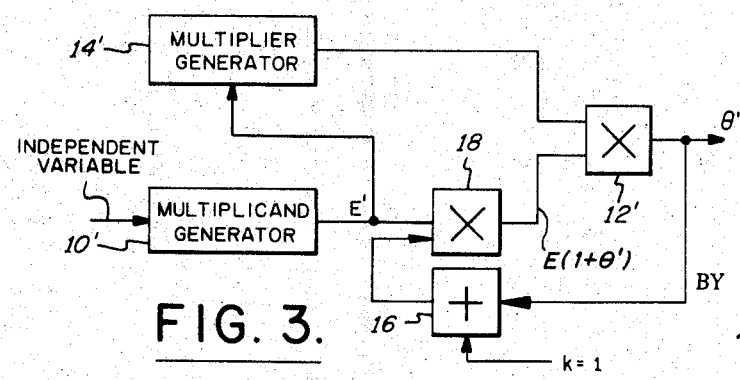
FIG. 3.
INVENTOR.
HARRY D. SMITH
BY
*S.C.Yeaton*
ATTORNEY

United States Patent Office 3,351,749
Patented Nov. 7, 1967

3,351,749
FUNCTION GENERATOR USING LINEAR ELEMENTS
Harry D. Smith, Old Bethpage, N.Y., assignor to Sperry Rand Corporation, Great Neck, N.Y., a corporation of Delaware
Filed Sept. 9, 1963, Ser. No. 307,515
8 Claims. (Cl. 235—197)

This invention relates in general to function generators and in particular teaches a way to provide a signal representing a nonlinear function of a variable, while using only substantially linear elements, i.e. elements which are adapted to receive a signal and nondistortionally operate on such signal. In its presently preferred form, the invention utilizes a pair of potentiometers both of which have their wipers driven by the same servo, one potentiometer being an output or feedback device and the other being an input device. In providing such a circuit configuration, use is made of three propositions which singly or in combination are not suggested by existing art. These propositions are:

I. If the magnitude of a first signal that varies as a linear function of an independent variable is used to determine the magnitude of a multiplier signal necessary to produce a product output signal that varies substantially nonlinearly as a function of such variable, then the function of the multiplier signal with respect to the independent variable will be substantially linear also.

II. If in proposition I the slope of the nonlinear function by which the product signal is adapted to change increases or decreases always in the same direction, and the linear manner in which the first signal varies as a function of the independent variable is at a rate that is never respectively more than or less than the minimum or maximum rates at which the product signal may so vary, then the first signal may be increased or decreased magnitude-wise respectively as a function of the product signal magnitude, with attendant further linearization in the manner in which the function by which the multiplier signal changes with respect to the independent variable.

III. The product signal, as may for example be produced in the manner suggested by proposition II, can without modification be applied to drive directly a servo device if the servo device provides a feedback signal that (1) varies directly and in a linear manner with respect to the independent variable, and (2) reaches a maximum magnitude equal to the magnitude of the product signal when the first signal reaches its maximum magnitude.

A principal object of the invention is to provide apparatus for producing a signal that varies as a nonlinear function of an input signal.

Another object of the invention is to provide apparatus for producing a signal that varies as a nonlinear function of an input signal and utilizes only elements which are substantially linear in nature.

Another object of the invention is to generate a product signal that varies as a nonlinear function of an independently variable signal by using such latter signal first to generate a multiplicand signal that varies as a linear function of the variable, and then using the multiplicand signal to determine the magnitude of a multiplier signal needed to produce such product signal.

Still another object of the invention is to provide servo apparatus that produces an output shaft rotation that varies as a nonlinear function of an input signal applied across an input potentiometer, the wiper of the potentiometer being driven by the servo.

The invention will be described with reference to the figures wherein:

FIG. 1 is a block diagram illustrating a fundamental teaching of the invention,
FIGS. 2a and 2b are diagrams useful in explaining the teaching illustrated in FIG. 1,
FIG. 3 is a block diagram illustrating still another teaching of the invention,
FIG. 4 is a diagram useful in explaining the teaching illustrated in FIG. 3,
FIG. 5 is a schematic diagram of a presently preferred configuration embodying the teachings of the invention, and
FIG. 6 is a diagram useful in describing the operation of the apparatus of FIG. 5.

Proposition I is best demonstrated with reference to FIG. 1 which depicts generally a fundamental aspect of the invention. In FIG. 1 a multiplicand generator 10 is adapted to produce an output signal E that varies linearly with respect to an independent variable. The multiplicand generator is essentially a linear transducer capable of converting a particular type of independent variable into a suitable corresponding voltage signal. If the independent variable occurs in the form of physical motion, for instance, a linear potentiometer may be used for the multiplicand generator. The output signal from the multiplicand generator 10 is applied to a conventional multiplying device 12. In addition, the multiplicand generator 10 cooperates (as indicated by a dashed line) with a multiplier generator 14 which provides multiplier signals that vary in magnitude in a manner dependent upon the magnitude of the signal E from the multiplicand generator 10. The multiplier generator 14 is essentially a transducer having predetermined linearity characteristics. If the multiplicand generator consists of a rotary potentiometer, for instance, the multiplier generator might conveniently consist of a tapered potentiometer driven from the same shaft. These multiplier signals are applied to the multiplying device 12, wherein they are multiplied by the signal E to produce an output signal θ that varies as a nonlinear function of the independent variable.

To appreciate the significance of the above-described combination of elements, reference should be had to FIG. 2a. In FIG. 2a, the signal E is shown as varying linearly with respect to the independent variable. See curve A. If the nonlinear function θ of the independent variable is to vary as shown by curve B, the multiplier generator 14, in response to the instantaneous magnitude of the signal E, produces multiplier signals of appropriate magnitudes as shown by the spokes C joining curves A and B. By multiplying such "spoke" signals by the signal E, a signal varying as the non-linear function θ of the input independent variable may be provided. The import of this aspect of the invention may be noted by plotting against the independent variable such multiplier signal magnitudes as are needed to produce the nonlinear function signal θ as represented by curve B of FIG. 2a. Such a plot appears in FIG. 2a and, on examination, indicates that the multiplier generator 14, when operating according to the invention, need only produce signals that vary with respect to the independent variable in a substantially linear manner. In other words, two signals each of which are substantially linear functions of a variable may be used to provide a third signal which varies quite nonlinearly with respect to the independent variable. In practical equipment, this means simplicity in the design of circuit elements, and attendant lessening of costs. For example, were a potentiometer to serve as the multiplier signal generator 14, it would be possible to wind such potentiometer quite linearly throughout most of its range (with a single short circuit being built into the potentiometer for the two multiplier values 1.3). This simple potentiometer design may be compared with what in the prior art would be required of a potentiometer wound to accommodate the nonlinear function of the independent variable as depicted by curve B.

Further linearization in the manner in which the multiplier generator signals vary with respect to the independent variable may be provided if the signal $\theta'$ to be produced represents a particular nonlinear function of the independent variable, viz. it is such that its rate of change continually changes only in one direction. That is, by employing the teaching of the above-mentioned proposition II, the circuit arrangement depicted by FIG. 1 may be modified as shown by FIG. 3. In FIG. 3 the independent variable is shown causing a multiplicand generator 10' to produce a signal E' that varies as a linear function of the independent variable. This signal E' according to proposition II must vary linearly with respect to the independent variable at a rate that is never greater than the minimum rate at which the signal $\theta'$ varies with respect to the independent variable when the rate of change for the signal $\theta'$, with respect to such variable, continually increases. This point is shown graphically in FIG. 4, i.e. curve A' for the signal E' is of a lesser slope than the minimum slope of the curve B' for the signal $\theta'$. Like the apparatus of FIG. 1, the multiplicand generator 10' cooperates with a multiplier generator 14' to provide multiplier signals of sufficient magnitudes to make the output signal $\theta'$ from a multiplying device 12', adapted to receive such multiplier signals, vary according to the above-mentioned particular nonlinear function. The generators 10' and 14' function the same as generators 10 and 14, respectively, of FIG. 1. The multiplying device 12' has its output signal applied in feedback fashion through a summing device 16 to a multiplying device 18, such multiplying device 18 receiving the multiplicand generator 10' output signal E' to modify it as a function of the output signal $\theta'$ from the multiplying device 12', i.e. when the signal $\theta'$ is such that its rate of change continually increases, the feedback is positive (and when such rate of change of $\theta'$ continually decreases the feedback is negative). The summing device 16, in addition to receiving the output signal from the multiplying device 12', receives also a signal representing unity, such being to avoid the problem of having element 18 operate to multiply by zero, i.e. when the signal E' is representative of a zero value, the signal $\theta'$ likewise represents a zero value.

To see how the apparatus of FIG. 3 further linearizes the relationship between the multiplier generator 14' output signals and the independent variable, reference should be had to FIG. 4. Curve B' represents the manner in which the desired function varies nonlinearly with respect to the independent variable; in accordance with proposition II, the slope of curve B' continually increases over its entire range. By feeding back in positive feedback fashion the signal appearing at the output of the multiplying device 12', the multiplicand generator 10' output signal, which varies linearly with respect to the independent variable as shown by curve A', may be modified so that it varies with respect to the independent variable as depicted by curve D. By inspection, the multiplier generator 14' "spoke" signals may be easily seen to vary more linearly with respect to the independent variable using such feedback arrangement than when feedback is not used.

With the feedback technique described immediately above, the multiplicand generator 10' must provide an output signal E' that varies linearly with respect to the independent variable at a rate that depends on the nature of the nonlinear function. For example, when the nonlinear function curve B' has its slope gradually increase, the slope of the multiplicand generator 10' output signal curve A' must be less than the minimum slope of the curve B'; should curve B' be such that its slope gradually decreases, the multiplicand generator 10' would then have to provide a signal that linearly rises with respect to the independent variable at a rate that is never less than the maximum rate at which the nonlinear function changes. This latter situation is exemplified by the presently preferred circuit configuration depicted in FIG. 5.

In FIG. 5 a potentiometer 20 adapted to have applied across it the signal E'' (which varies linearly with respect to an independent variable) combines in a single element the jobs performed by FIG. 3 elements 12', 14', 16 and 18. The wiper of the potentiometer 20 is so driven by the shaft 22 of a position servo 24 that when the servo receives no input signal the wiper of the potentiometer 20 is farthest electrically from ground. Also driven by the servo shaft 22 is the wiper of a potentiometer 26, such wiper being driven so that it moves farther electrically from ground as the servo input signal increases in magnitude, and when the servo 24 receives no input signal, the potentiometer 26 wiper connects to ground. The signals appearing on the wipers of the potentiometers 20 and 26 are applied to a summing device 28 which algebraically adds them to produce a resultant signal for driving the servo 24. Whereas the potentiometer 26 has a linearly spaced winding, the winding of the potentiometer 20 is so arranged that the signal E'' as modified via feedback by the servo 24 is further varied sufficiently (as a function of the necessary "spokes") to make the servo input signal vary as the desired function. The signal 1 applied across the potentiometer 26 must equal the maximum signal that may be applied to the servo 24 using the instant scheme. This assures according to proposition III that the feedback signal will vary in a linear manner with respect to the function output shaft signal $\theta''$.

Referring to FIG. 6, operation of the circuit arrangement of FIG. 5 will now be described. By applying a signal E'' (which varies linearly with respect to the independent variable) across the potentiometer 20, the servo output shaft 22 rotates nonlinearly up to a scaled value of $\theta''=1$ as depicted by curve B''. That is, the feedback potentiometer 26, having applied across it a signal representative of unity, constantly has its wiper driven in follow-up to cancel the servo input signal which appears on the wiper of the potentiometer 20, and which by being appropriately wound can never enable its wiper to receive a signal greater than unity. This is in accordance with proposition III. Therefore, even though the signal E'' increases to a scale value of say 1.5, the potentiometer 26 wiper will always apply a signal which is sufficient to cancel the servo input signal appearing on the wiper of the potentiometer 20. Proposition II is likewise complied with by the apparatus of FIG. 5 since the slope of the function curve B'' gradually decreases, and the linear manner in which the signal E'' varies as a function of the independent variable is at a rate that is never less than (in this case the rate of change is equal to) the maximum rate at which the servo input signal appearing on the wiper of the potentiometer 20 varies with respect to the variable.

Beneath the abscissa of the curves shown in FIG. 6, there is indicated multiplier signal values as are needed to be wound into the function potentiometer 20 for shaft rotations $\theta''$ for various magnitudes of the signal E''. For small values of E'', i.e. when the multiplier signal values are unity, the potentiometer 20 is provided with an appropriate short circuit across some of its windings. Thereafter the potentiometer 20 has its windings so arranged that corresponding increases in the rotational position of its wiper produce substantially linear changes in the signals appearing on such wiper. As above noted this feature greatly increases simplicity in potentiometer design.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. Apparatus for producing a signal representing a nonlinear function of a variable that continually changes slope only in one direction comprising first means adapted to produce a first signal that varies as a linear function of said variable at a rate that is never greater and never less respectively than the minimum and maximum rates at which said nonlinear function varies with respect to said variable when the slope of said nonlinear function respectively continually increases and continually decreases, second means for multiplying two signals to produce a product output signal, modifying means responsive to said product signal to increase and decrease the magnitude of said linear function signal in proportion to the instantaneous magnitude of said product signal when respectively the slope of said nonlinear function signal continually increases and continually decreases, and third means responsive according to the magnitude of said first signal to produce a multiplier signal the instantaneous magnitude of which is such that the product of the signal from said modifying means and said multiplier signal varies like said nonlinear function of said variable, said multiplier signal and the signal from said modifying means being the two signals applied to said multiplying means.

2. Apparatus for producing a shaft rotation that is a nonlinear function of a signal representing a variable comprising motor means having an output shaft, first and second signal transducer means being each driven by said motor means output shaft and being adapted to modify its respective applied signal to increase and decrease such signal when the other transducer means decreases and increases its applied signal, said first transducer means being adapted to increase and decrease its applied signal as a linear function of said variable and said second transducer means being adapted to decrease and increase its applied signal so that its modified electrical output signal varies as said nonlinear function of said variable, means for applying to said first transducer means a signal having a magnitude equal to the maximum magnitude of the modified output signal from said second transducer means, means for comparing the output signals of said transducer means to produce an error signal, said error signal being applied to drive said motor means, and said second transducer means being adapted to have applied thereto the signal that varies as a linear function of said variable.

3. The apparatus of claim 2 wherein said first and second transducer means are both potentiometers.

4. Apparatus for producing a product signal representing a specified nonlinear function of an independent variable comprising means for producing a first signal that varies as a linear function of said independent variable, multiplying means for producing a product signal, feedback means to modify said first signal in response to a product signal, means to couple a modified first signal into said multiplying means, multiplier means to couple a multiplier signal into said multiplying means in response to a first signal, said multiplier means having a transfer characteristic such that the instantaneous magnitude of the multiplier signal is equal to the ratio of a product signal to the corresponding modified first signal.

5. The apparatus of claim 4 wherein the feedback means acts to decrease the magnitude of said product signal as a function of itself when said nonlinear function of said variable has a slope which never increases, and the means producing said first signal produces a signal whose function with respect to said variable varies linearly at a rate never less than the maximum rate that said nonlinear function changes.

6. The apparatus of claim 4 wherein the feedback means acts to increase the magnitude of said product signal as a function of itself when said nonlinear function of said variable has a slope which never decreases, and the means producing said first signal produces a signal whose function with respect to said variable varies linearly at a rate never greater than the minimum rate that said nonlinear function changes.

7. Apparatus for producing a mechanical displacement that varies as a nonlinear function of an independent variable comprising first and second potentiometers, the wiper of one potentiometer being driven to increase and decrease the signal thereon when the wiper of the other potentiometer is driven to decrease and increase the signal on it, the first of said potentiometers being adapted to receive a signal that varies as a linear function of said variable and being so wound that the electrical signal appearing on its wiper varies as said nonlinear function of said independent variable, the other potentiometer being linearly wound and being adapted to have applied thereto a signal that equals in magnitude the magnitude of the maximum signal that can appear on the wiper of said first potentiometer, and servo means for displacing both for said potentiometer wipers in proportion to the difference between the signals on said wipers.

8. Apparatus for producing a rotary displacement that varies as a nonlinear function of an independent variable comprising first and second potentiometers, the wiper of one potentiometer being adapted to be driven to increase and decrease the electrical signal thereon when the wiper of the other potentiometer is driven to decrease and increase the electrical signal on it, the first of said potentiometers being adapted to receive a signal that varies as a linear function of said variable and being so wound that the electrical signal appearing on its wiper varies as said nonlinear function of said variable, the other potentiometer being linearly wound and being adapted to have applied thereto an electrical signal that equals in magnitude the magnitude of the maximum signal that can appear on the wiper of said first potentiometer, means receiving the electrical signals on said wipers to compare said signals so as to produce an electrical error signal, and motor means responsive to said error signal to rotate both of said potentiometer wipers in proportion thereto.

References Cited
UNITED STATES PATENTS

| | | | |
|---|---|---|---|
| 2,894,685 | 7/1959 | Spencer et al. | 235—197 |
| 3,226,617 | 12/1965 | Smith et al. | 318—18 X |
| 3,250,898 | 5/1966 | Vasu | 235—194 X |

OTHER REFERENCES

Gray, H. L.: A Guide to Applying Resistance Pots in Control Engineering, July 1956, pp. 80–93.

MALCOLM A. MORRISON, *Primary Examiner.*

I. KESCHNER, J. RUGGIERO, *Assistant Examiners.*